United States Patent
Haynes et al.

(10) Patent No.: US 10,494,110 B2
(45) Date of Patent: Dec. 3, 2019

(54) EVACUATION SLIDE RESTRAINT

(71) Applicant: GOODRICH CORPORATION, Charlotte, NC (US)

(72) Inventors: Timothy C. Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 292 days.

(21) Appl. No.: 15/599,270

(22) Filed: May 18, 2017

(65) Prior Publication Data

US 2018/0334256 A1    Nov. 22, 2018

(51) Int. Cl.
*B64D 25/14* (2006.01)
*B65D 63/10* (2006.01)

(52) U.S. Cl.
CPC ......... *B64D 25/14* (2013.01); *B65D 63/1081* (2013.01)

(58) Field of Classification Search
CPC ............................ B64D 25/14; B64D 63/1081
USPC ........................................................ 244/137.2
See application file for complete search history.

(56) References Cited

U.S. PATENT DOCUMENTS

| | | | |
|---|---|---|---|
| 3,391,771 A * | 7/1968 | Day ................... | A62B 1/20 193/25 A |
| 3,463,266 A * | 8/1969 | Day ................... | B64D 25/14 182/48 |
| 3,606,939 A | 9/1971 | Summer et al. | |
| 3,621,383 A * | 11/1971 | Rush ................... | B64D 25/14 324/414 |
| 3,897,861 A * | 8/1975 | Miller ................. | B64D 25/14 193/25 B |
| 3,973,645 A * | 8/1976 | Dix ..................... | B64D 25/14 182/48 |
| 3,991,444 A | 11/1976 | Bailey | |
| 4,567,977 A | 2/1986 | Fisher | |
| 5,711,495 A * | 1/1998 | Danielson ........... | B64D 25/14 242/421 |

(Continued)

FOREIGN PATENT DOCUMENTS

| | | | |
|---|---|---|---|
| DE | 8903806 | 5/1989 | |
| DE | 19949484 C1 * | 12/2000 | ............... A62B 1/20 |

(Continued)

OTHER PUBLICATIONS

European Patent Office, European Search Report dated Sep. 28, 2018 in Application No. 18172874.2-1010.

*Primary Examiner* — Christopher P Ellis
(74) *Attorney, Agent, or Firm* — Snell & Wilmer L.L.P.

(57) ABSTRACT

A restraint may include a longitudinal body having a first end and a second end. The restraint may also include a plurality of engagement features distributed between the first end and the second end. A dimension of at least one of the longitudinal body and the plurality of engagement features may vary along at least a portion of a length of the longitudinal body. The restraint may further include a head disposed at the first end of the longitudinal body. The head may define an aperture and may include a pawl that configured to individually engage the plurality of engagement features. The dimension may vary incrementally or continuously along at least the portion of the length of the longitudinal body from the first end to the second end.

9 Claims, 5 Drawing Sheets

(56) References Cited

U.S. PATENT DOCUMENTS

| | | | | |
|---|---|---|---|---|
| 5,906,340 A | * | 5/1999 | Duggal | B64D 25/14 182/48 |
| 2004/0074696 A1 | * | 4/2004 | Horvath | B64D 25/14 182/48 |
| 2010/0258677 A1 | * | 10/2010 | O'Donnell | B64D 25/14 244/137.2 |
| 2018/0171657 A1 | * | 6/2018 | Haynes | E04H 15/44 |
| 2018/0201381 A1 | * | 7/2018 | Volny | B64D 25/14 |
| 2018/0327101 A1 | * | 11/2018 | Haynes | B64D 25/14 |

FOREIGN PATENT DOCUMENTS

| | | | | |
|---|---|---|---|---|
| EP | 0110206 A1 | * | 6/1984 | A62B 1/20 |
| EP | 0163925 A1 | * | 12/1985 | A62B 1/20 |
| EP | 0660018 | | 6/1995 | |
| EP | 0782957 | | 7/1997 | |
| EP | 3348482 A1 | * | 7/2018 | B64D 25/14 |
| EP | 3378756 A1 | * | 9/2018 | B63C 9/22 |
| EP | 3395689 A1 | * | 10/2018 | B64D 25/14 |
| EP | 3403930 A1 | * | 11/2018 | B64D 25/14 |
| EP | 3403931 A1 | * | 11/2018 | B63C 9/04 |

\* cited by examiner

EVACUATION SLIDE RESTRAINT

FIELD

The present disclosure relates to aircraft evacuation assemblies, and more specifically to restraints for evacuation slides.

BACKGROUND

An evacuation slide assembly may include an inflatable slide that helps passengers disembark from an aircraft in the event of an emergency or other evacuation event. The slides may deploy from a door sill or a side of the aircraft fuselage. Controlling the deployment dynamics of an evacuation slide is often an important consideration that may affect the safety, efficiency, and overall feasibility of an evacuation.

SUMMARY

According to various embodiments, the present disclosure provides a restraint that includes a longitudinal body having a first end and a second end. The restraint may also include a plurality of engagement features distributed between the first end and the second end. The restraint also includes, according to various embodiments, a head disposed at the first end of the longitudinal body, the head defining an aperture and include a pawl. The pawl may be configured to engage an engagement feature of the plurality of engagement features. In various embodiments, a dimension of at least one of the longitudinal body and the plurality of engagement features varies along at least a portion of a length of the longitudinal body.

In various embodiments, the dimension varies incrementally or continuously along at least the portion of the length of the longitudinal body from the first end to the second end. In various embodiments, the dimension increases incrementally or continuously along at least the portion of the length of the longitudinal body from the second end to the first end.

In various embodiments, the pawl is configured to sequentially traverse the plurality of engagement features in response to insertion, in a first direction, of the second end of the longitudinal body through the aperture of the head. In various embodiments, engagement between the pawl and a respective engagement feature of the plurality of engagement features prevents retraction, in a second direction opposite the first direction, of the longitudinal body through the aperture of the head such that the restraint forms a closed loop.

In various embodiments, a tensile strength of the closed loop is dependent upon the dimension of at least one of the respective engagement feature and a section of the longitudinal body adjacent the respective engagement feature. In various embodiments, a breaking load of the restraint is selectably adjustable based on the dimension of at least one of the respective engagement feature and a section of the longitudinal body adjacent the respective engagement feature. In various embodiments, the longitudinal body includes two side arms and the plurality of engagement features includes a plurality of rungs extending between the two side arms in a direction perpendicular to the length of the two side arms. The dimension may be a cross-sectional thickness of each of the side arms. The dimension may be a cross-sectional thickness each rung of the plurality of rungs. In various embodiments, the dimension is a cross-sectional thickness of each of the side arms and the plurality of rungs.

Also disclosed herein, according to various embodiments, is an evacuation assembly of an aircraft. The evacuation assembly may include an evacuation slide, a strap coupled between the evacuation slide and the aircraft, and a restraint coupled between the strap and at least one of the evacuation slide and the aircraft. In various embodiments, a dimension of the restraint varies along at least a portion of a length of the restraint. In various embodiments, the restraint forms a closed loop such that a tensile strength of the closed loop is dependent upon the dimension. In various embodiments, the dimension varies incrementally or continuously along at least the portion of the length of the restraint. In various embodiments, the dimension increases incrementally or continuously along at least the portion of the length.

In various embodiments, the restraint includes a longitudinal body having a first end and a second end. The restraint may further include a plurality of engagement features distributed between the first end and the second end. The dimension is of at least one of the longitudinal body and the plurality of engagement features. The restraint may also include a head disposed at the first end of the longitudinal body and the head may define an aperture and may include a pawl. The pawl may be configured to individually engage the plurality of engagement features.

In various embodiments, the pawl is configured to sequentially traverse the plurality of engagement features in response to insertion, in a first direction, of the second end of the longitudinal body through the aperture of the head. In various embodiments, engagement between the pawl and a respective engagement feature of the plurality of engagement features prevents retraction, in a second direction opposite the first direction, of the longitudinal body through the aperture of the head such that the restraint forms the closed loop.

In various embodiments, the longitudinal body includes two side arms and the plurality of engagement features includes a plurality of rungs extending between the two side arms in a direction perpendicular to the length of the two side arms. In various embodiments, the dimension is a cross-sectional thickness of each of the side arms. In various embodiments, the cross-sectional thickness of the each of the side arms increases incrementally or continuously along at least the portion of the length from the second end to the first end.

Also disclosed herein, according to various embodiments, is a method of assembling an evacuation assembly of an aircraft. The method may include forming a closed loop from a restraint and adjusting the restraint to change a tensile strength of the closed loop. The closed loop may couple a strap to at least one of an evacuation slide and the aircraft and a dimension of the restraint may vary along at least a portion of the restraint that forms the closed loop. The tensile strength, according to various embodiments, is dependent upon the dimension. In various embodiments, the closed loop is a first closed loop, the restraint is a first restraint, the strap is a first strap, the dimension is a first dimension, and the tensile strength is a first tensile strength. The method may further include forming a second closed loop from a second restraint and adjusting the second restraint to change a second tensile strength of the second closed loop. The second closed loop couples a second strap to at least one of the evacuation slide and the aircraft and a second dimension of the second restraint varies along at least a portion of the second restraint that forms the second closed loop, according to various embodiments. The second tensile strength of the second closed loop may be dependent upon the second dimension. In various embodiments, the first dimension is different than the second dimension and the first tensile strength is different than the second tensile strength.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
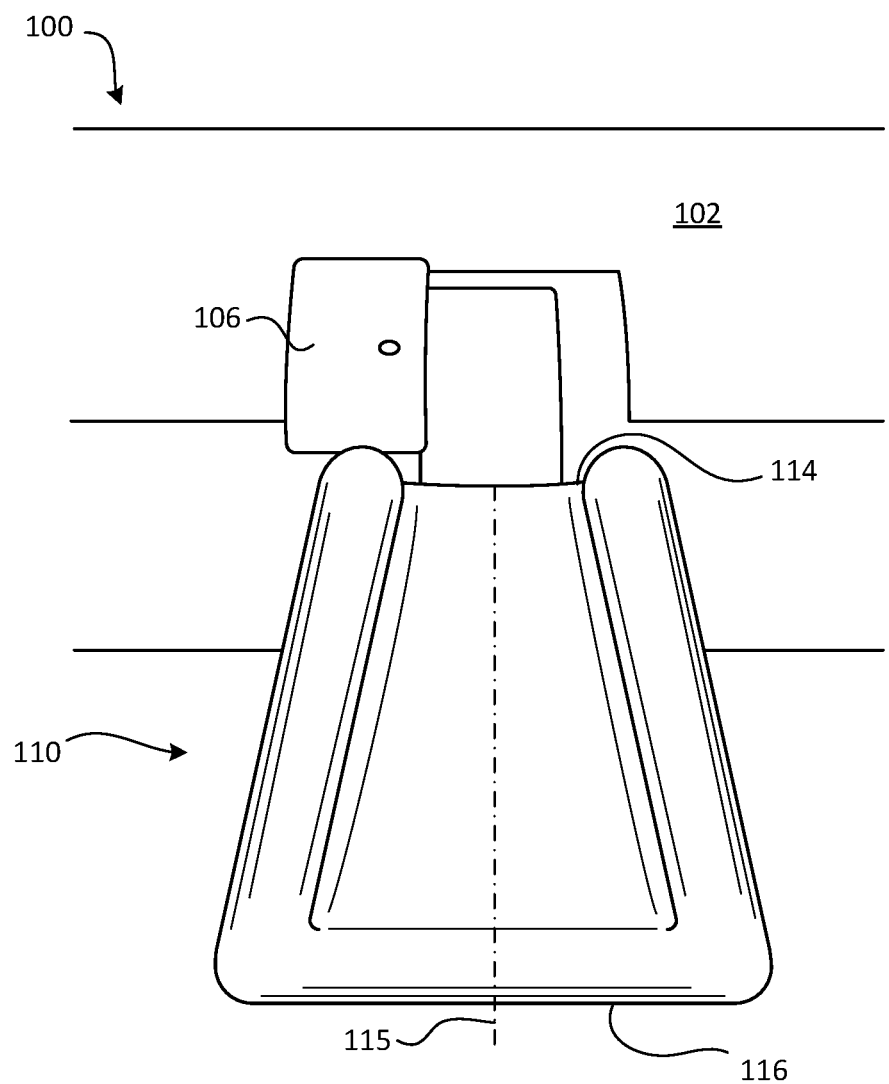
FIG. 1A is a schematic view of an aircraft showing an evacuation slide of an evacuation assembly in a deployed state, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. Throughout the present disclosure, like reference numbers denote like elements. Accordingly, elements with like element numbering may be shown in the figures but may not be necessarily be repeated herein for the sake of clarity.

A first component that is "axially outward" of a second component means that a first component is positioned at a greater distance in either longitudinal direction away from the longitudinal center of the composite component along its longitudinal axis than the second component. A first component that is "axially inward" of a second component means that the first component is positioned closer to the longitudinal center of the composite component along its longitudinal axis than the second component.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, and with reference to FIG. 1A, an evacuation slide 110 of an evacuation assembly of an aircraft 100 is provided. Aircraft 100 may include a fuselage 102 with wings fixed to the fuselage 102. Emergency exit door 106 may disposed on the fuselage 102 over one of the wings or at some other location along the fuselage 102. The evacuation slide 110 and other components of the evacuation assembly may be housed within a packboard or other compartment mounted to the aircraft 100. The evacuation assembly may jettison a blowout panel to deploy the evacuation slide 110, such as an inflatable evacuation slide, in response to the emergency exit door 106 opening or in response to another evacuation event. For example, FIG. 1a schematically depicts the evacuation slide 110 in a deployed state extending from the fuselage 102 of the aircraft 100.

Conventional evacuation slides may be susceptible to undesirable deployment characteristics. Improper restraint mechanisms, among other factors, may cause conventional slides to deploy in an uncontrolled or unsafe manner. For example, if an evacuation slide is not properly restrained/controlled during deployment, portions or sections of the slide may sag downwards before being properly inflated and such sagging sections may get caught on portions of the aircraft and may be damaged or may otherwise create an unsafe evacuation environment. In another example, if an evacuation slide is not properly restrained, the toe end of a slide may extend too high relative to the ground/water. Such a deployment may cause the evacuation slide to "kite" (especially if the evacuation slide is deployed in high wind conditions) such that the toe end of the slide does not touch the ground, rendering the slide less usable. Furthermore, if the slide lifts off the ground above the level of the emergency exit door 106, the slide may even block the aircraft exit and prevent safe evacuation of passengers and crew.

Disclosed herein, according to various embodiments, is a restraint 120 (with momentary reference to FIGS. 1B and 1C) that facilitates proper deployment of the evacuation slide 110. The restraint 120, as described in greater detail below, may be generally configured to be coupled to one or more straps 150A, 150B (with momentary reference to FIG. 5) and the restraint 120 may have an adjustable tensile strength that allows for a controllably restrained deployment of the evacuation slide 110. Said differently, the restraint 120, having adjustable tensile strength properties, may break in response to a predetermined tensile force exerted on the restraint 120 by deployment (e.g., inflation) of the evacuation slide 110. Thus, the evacuation slide 110 can be controllably, safely, and properly deployed to extend from a head end 114 of the evacuation slide 110 mounted to the aircraft 100 to a toe end 116 of the evacuation slide 110 that is contacting the ground (or water, in the event of a water landing). In various embodiments, the evacuation slide 110 includes a longitudinal axis 115 that extends from the head end 114 to the toe end 116. While numerous details are included herein pertaining to utilizing the restraint 120 in conjunction with the evacuation slide 110 and in the context of an evacuation assembly of an aircraft, the restraint 120 may be utilized for other purposes and in other applications.

Figure 1B:
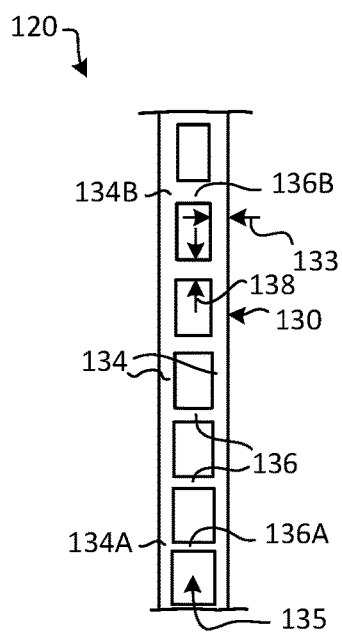
FIG. 1B is a schematic view of a restraint, in accordance with various embodiments.
Figure 1C:
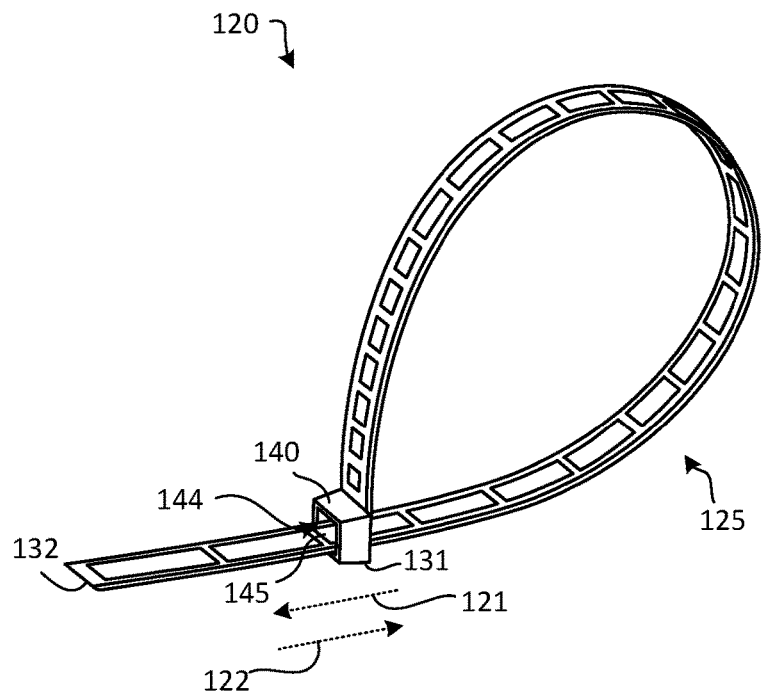
FIG. 1C is a schematic perspective view of the restraint of FIG. 1B, in accordance with various embodiments.

In various embodiments, and with reference to FIGS. 1B and 1C, the restraint 120 includes a longitudinal body 130, a plurality of engagement features 135, and a head 140. The longitudinal body 130 has a first end 131 and a second end 132 and the plurality of engagement features 135 are distributed between the first end 131 and the second end 132, according to various embodiments. The head 140 is disposed at the first end 131 of the longitudinal body 130, according to various embodiments. The head 140 may define an aperture 144 and the head 140 may include a pawl 145. The longitudinal body 130, the plurality of engagement features 135, and the head 140 may be integrally formed and thus the restraint 120 may be a monolithic structure having a body portion (e.g., 130), multiple engagement features (e.g., 135), and a head portion (e.g., 140).

In various embodiments, a dimension of restraint 120 varies along at least a portion of a length of the longitudinal body 130. Said differently, over at least a portion of the longitudinal body 130 of the restraint 120, a dimension, such as a cross-sectional thickness 133, of the longitudinal body 130 or a cross-sectional thickness 138 of the plurality of engagement features 135 (or both) varies, according to various embodiments. Thus, the restraint 120 includes features that have non-uniform dimensions. As described in greater detail below, the non-uniformity of the dimensions along the length of the restraint 120 allows the tensile strength of the restraint to be adjusted, which changes the magnitude of the tensile force that will cause the restraint 120 to break, thereby allowing the deployment of the evacuation slide 110 to be controlled. Accordingly, a breaking load of the restraint is selectably adjustable, for example, by an operator, based on the dimension of at least one of the respective engagement feature and a section of the longitudinal body 130 adjacent the respective engagement feature, according to various embodiments. For example, the restraint 120 may adjusted by an operator, as described in greater detail below, to break in response to a certain deployment condition (e.g., inflation of a first section of the evacuation slide 110 and/or inflation to a predetermined inflation pressure).

In various embodiments, for example, the dimension of the longitudinal body 130 varies, either incrementally or continuously, along at least a portion of the length of the longitudinal body 130 from the first end 131 to the second end 132. In various embodiments, the dimension increases, either incrementally (in a step wise fashion) or continuously, along at least a portion of the length of the longitudinal body 130 from the second end 132 to the first end 131.

The pawl 145 is configured to individually engage the plurality of engagement features 135 of the longitudinal body 130, according to various embodiments. The plurality of engagement features 135 may include lips, teeth, edges, grooves, channels, protrusions, rungs, and the like and the pawl 145 may include a feature that contacts the engagement features 135 to allow relative movement of the engagement features 135 in a first direction 121 but prevents relative movement of the engagement features 135 in a second direction 122. Said differently, the pawl 145 may be configured to sequentially traverse the plurality of engagement features 135 in response to insertion, in a first direction 121, of the second end 132 through the aperture 144 of the head 140 but the pawl 145 may be configured to prevent retraction, in a second direction 122 opposite the first direction 121, of the longitudinal body 130 through the aperture 144 defined by the head 140 (e.g., engagement between the pawl 145 and a respective engagement feature of the plurality of engagement features 135 prevents retraction in the second direction 122). In various embodiments, the pawl is generally disposed within the aperture 144 defined by the head 140.

By inserting the second end 132 of the longitudinal body 130 of the restraint 120 through the aperture 144 of the head 140 in the first direction 121, and because of the interlocked engagement between the pawl 145 and a respective engagement feature, which prevents movement retraction of the longitudinal body 130 in the second direction 122, the restraint 120 forms a closed loop 125. In various embodiments, the tensile strength of the closed loop 125 is dependent upon the dimension of the restraint 120 in the vicinity of the pawl 145. Said differently, a dimension of the engagement feature being retained/engaged by the pawl 145 (e.g., the respective engagement feature) and/or a dimension of the longitudinal body in the vicinity of the respective engagement feature affects the tensile strength of the closed loop 125, which thereby affects the magnitude of the tensile force that will break the restraint 120. Accordingly, a user/operator may select the engagement position of the pawl 145 along the longitudinal body 130, thereby setting the tensile strength (e.g., the breaking point) of the restraint. Additional details and examples are included immediately below.

In various embodiments, and with reference to FIG. 1B, the longitudinal body 130 includes two side arms 134 and the plurality of engagement features 135 include a plurality of rungs 136 extending between the two side arms 134 (e.g., the longitudinal body 130 may define openings or windows between the two side arms 134 and between adjacent rungs of the plurality of rungs 136). In various embodiments, and with continued reference to FIG. 1B, the dimension of the side arms 134 (e.g., the longitudinal body 130) and the dimension of the rungs 136 (e.g., the plurality of engagement features) vary along the length of the restraint 120. For example, side arm 134A has a smaller dimension, such as a smaller cross-sectional diameter, than side arm 134B and rung 136A has a smaller dimension than rung 136B. The variation in the dimensions may be incremental or the variation may be a smooth, continuous transition.

Figure 2:
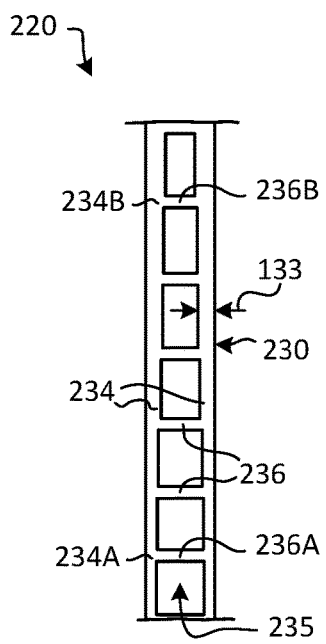
FIG. 2 is a schematic side view of another implementation of the restraint, in accordance with various embodiments.

In various embodiments, and with reference to FIG. 2, restraint 220 has a longitudinal body 230 that includes two side arms 234 and the restraint 220 also includes a plurality of engagement features 235 that are rungs 236 (that extend substantially perpendicular to the length of the longitudinal body 230). In various embodiments, and with reference to restraint 220 in FIG. 2, the rungs 236 of the restraint 220 have a constant dimension (e.g., cross-sectional diameter) but the side arms 234 of the restraint 220 vary along at least a portion of the length of the restraint 220. For example, side arm 234A has a smaller cross-sectional dimension than side arm 234B while rung 236A has the same cross-sectional dimension as rung 236B. In such embodiments, the variation in the cross-sectional dimension of the longitudinal body 230 (e.g., the side arms 234) imparts the adjustable tensile strength to the closed loop.

Figure 3:
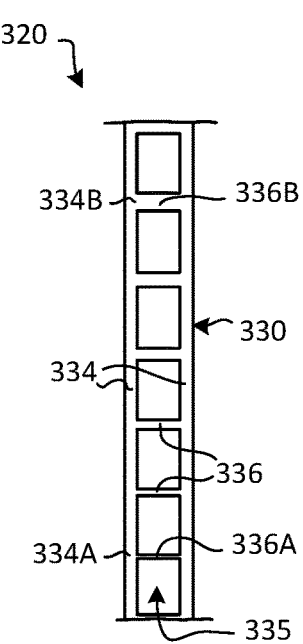
FIG. 3 is a schematic side view of another implementation of the restraint, in accordance with various embodiments.

In various embodiments, and with reference to FIG. 3, restraint 320 has a longitudinal body 330 that includes two side arms 334 and the restraint 320 also includes a plurality of engagement features 335 that are rungs 336. In various embodiments, and with reference to restraint 320 in FIG. 3, the side arms 334 of the restraint 320 have a constant dimension (e.g., cross-sectional diameter) but the rungs 336 of the restraint 320 vary along at least a portion of the length of the restraint 320. For example, rung 336A has a smaller cross-sectional dimension than rung 336B while side arm 334A has the same cross-sectional dimension as side arm 334B. In such embodiments, the variation in the cross-sectional dimension of the plurality of engagement features 335 (e.g., the rungs 336) imparts the adjustable tensile strength to the closed loop.

Figure 4:
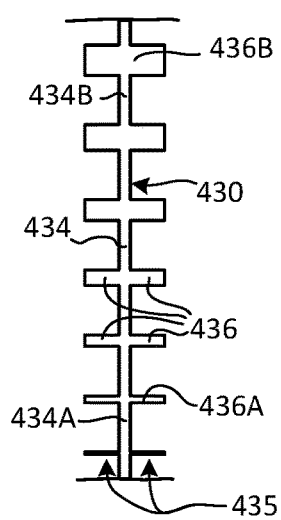
FIG. 4 is a schematic side view of yet another implementation of the restraint, in accordance with various embodiments.

In various embodiments, and with reference to FIG. 4, restraint 420 has a longitudinal body 430 that includes a single, central arm 434 and the restraint 420 also includes a plurality of engagement features 435 that are rungs 436 extending outwards from the central arm 434. In various embodiments, and with reference to restraint 420 in FIG. 4, the single, central arm 434 of the restraint 420 has a constant dimension (e.g., cross-sectional diameter) but the rungs 436 of the restraint 420 vary along at least a portion of the length of the restraint 420. For example, rung 436A has a smaller cross-sectional dimension than rung 436B while central arm 434A has the same cross-sectional dimension as central arm 434B. In such embodiments, the variation in the cross-sectional dimension of the plurality of engagement features 435 (e.g., the rungs 436) imparts the adjustable tensile strength to the closed loop. In various embodiments, the pawl may be configured to engage rungs 436 that extend outwards from a central arm 434.

Figure 5:
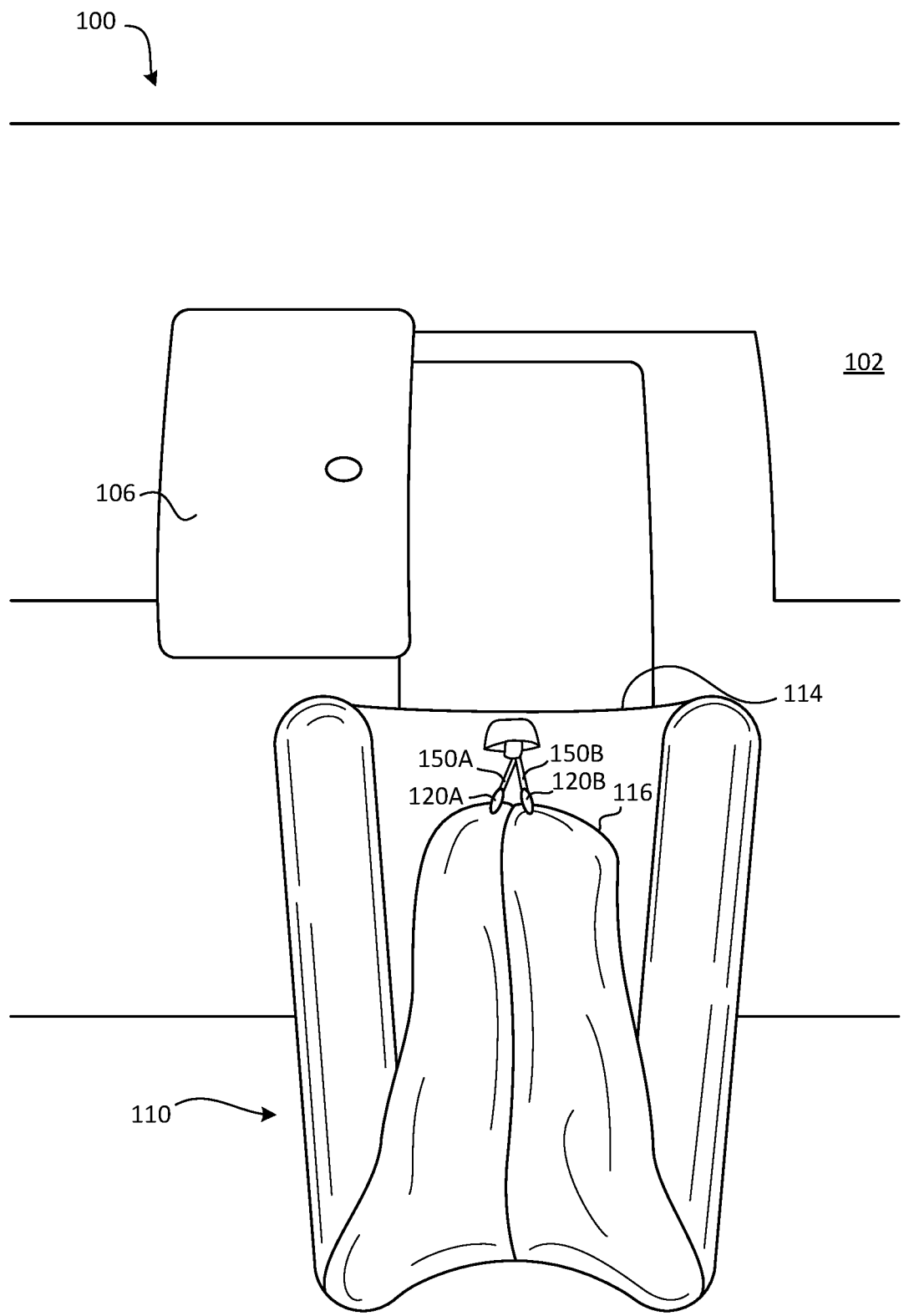
FIG. 5 is a schematic view of an evacuation assembly including an evacuation slide in a stage of deployment, in accordance with various embodiments.
Figure 6:
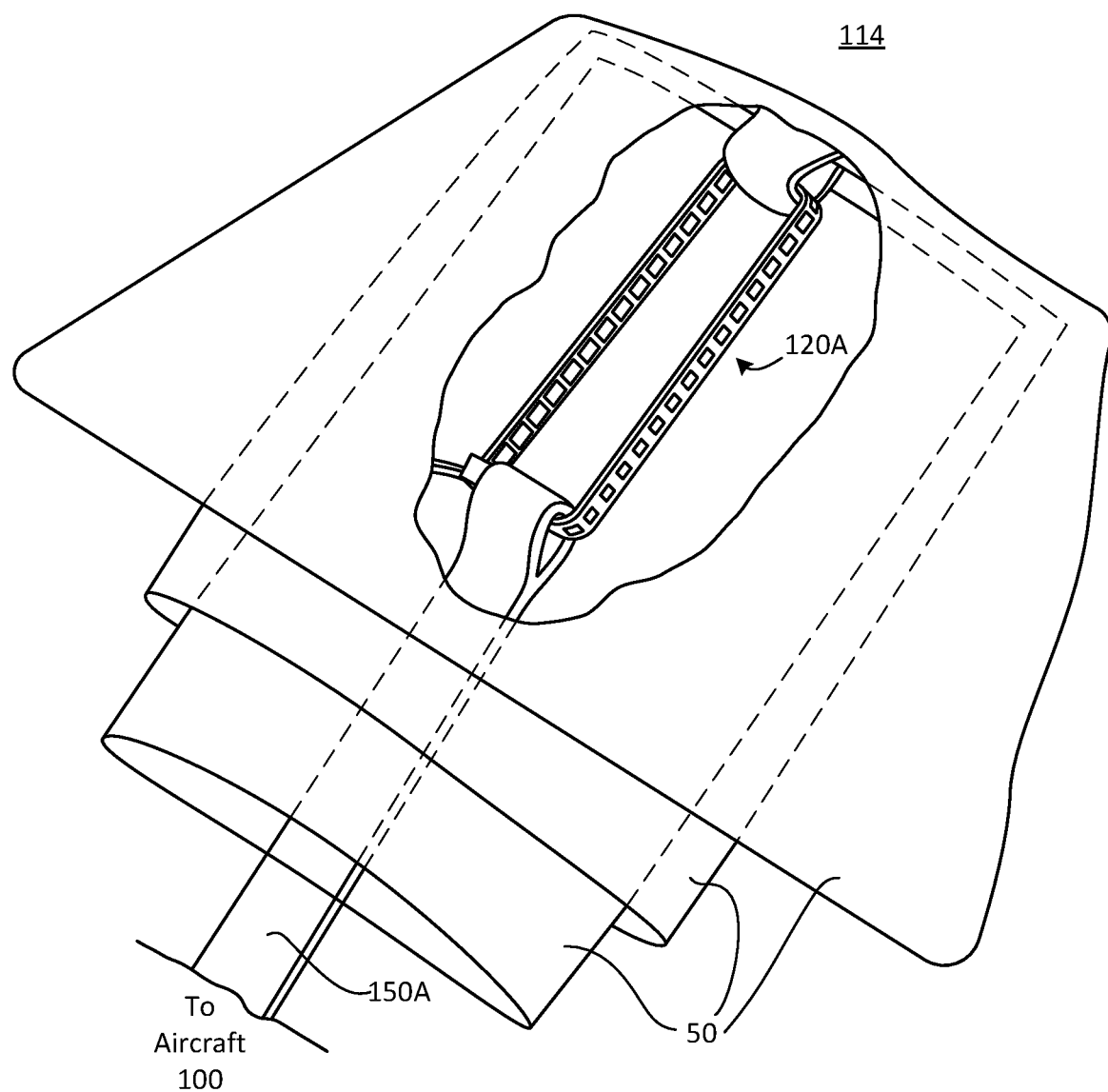
FIG. 6 is a magnified view of a restraint forming a closed loop that is coupled to a strap of the evacuation assembly, in accordance with various embodiments.

In various embodiments, and with reference to FIGS. 5 and 6, an evacuation assembly of an aircraft is provided. The evacuation assembly includes an evacuation slide 110, one or more straps 150A, 150B, and one or more restraints 120A, 120B. The strap 150A may be coupled between the evacuation slide 110 and the aircraft 100 or the strap 150A may be coupled at two different locations along the evacuation slide 110. The restraint 120A may be coupled between the strap 150A and at least one of the evacuation slide 110 and the aircraft 100. Said differently, the restraint 120A is disposed at one end of the strap, either between the evacuation slide 110 and the strap 150A or between the strap 150A and the aircraft 100, according to various embodiments. For example, FIG. 5 shows a schematic depiction of restraint 120A being coupled between the strap 150A and the toe end 116 of the evacuation slide 110 and FIG. 6 shows a depiction of restraint 120A being coupled between the strap 150A and another location (e.g., the head end 114) of the evacuation slide 110.

The evacuation slide 110 depicted in FIG. 5 is in an intermediate deployment state, and the straps 150A, 150B, together with the restraints 120A, 120B restrain, limit, control, and/or guide the deployment of the evacuation slide 110. For example, in response to the evacuation slide 110 being inflated to a certain extent, the inflation pressure may be such that the deploying evacuation slide 110 exerts a predetermined tensile force against/through the straps 150A, 150B and the restraints 120A, 120B. As mentioned above, due to the variation in the dimensions of the restraints 120A, 120B, the restraints 120A, 120B may be configured to break at the predetermined tensile force to allow the evacuation slide 110 to continue its deployment in an orderly, controlled manner. In various embodiments, multiple restraints 120A, 120B may be utilized with multiple straps 150A, 150B, and each restraint may be adjusted to have a closed loop with a different tensile strength, thereby enabling a staged deployment of the evacuation slide 110. In various embodiments, and with reference to FIG. 6, the restraint 120A and/or a portion of the strap 150A may be partially enclosed by one or more protective layers 50 that prevent the restraint 120A from becoming a potentially harmful projectile in response to reaching its structural limit/threshold.

In various embodiments, the restraint is made from a plastic, composite, or other non-metallic material. In various embodiments, the restraining straps and features of the evacuation assembly are free of shear pins or other metallic restraint mechanisms.

Figure 7:
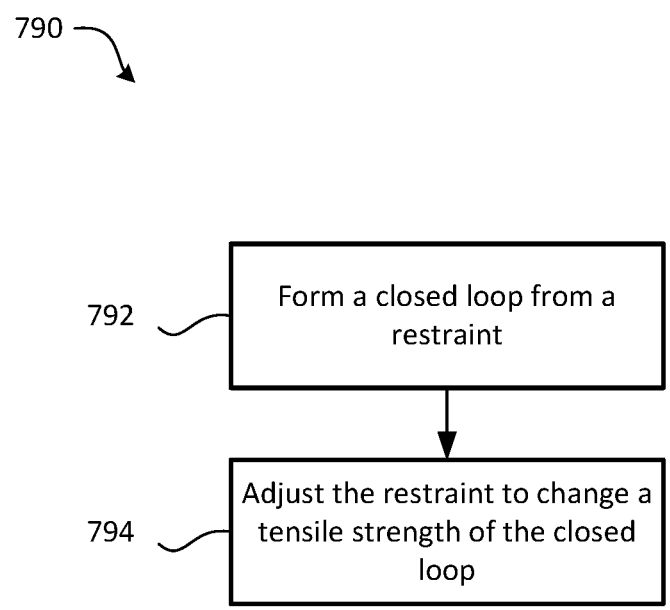
FIG. 7 is a schematic flow chart diagram of a method of assembling an evacuation assembly of an aircraft, in accordance with various embodiments.

In various embodiments, and with reference to FIG. 7, method 790 of assembling an evacuation assembly of an aircraft is provided. The method 790 may include forming a closed loop from a restraint at step 792 and adjusting the restraint to change a tensile strength of the closed loop at step 794. The closed loop may couple to either an evacuation slide or an aircraft (e.g., a fuselage, packboard, girt). The dimension of the restraint may vary along at least a portion of the restraint that forms the closed loop. The tensile strength of the closed loop may be dependent on the dimension.

In various embodiments, the closed loop is a first closed loop, the restraint is a first restraint, the strap is a first strap, the dimension is a first dimension, and the tensile strength is a first tensile strength. In such embodiments, the method 790 may further include forming a second closed loop from a second restraint, wherein the second closed loop couples a second strap to either the evacuation slide or the aircraft and adjusting the second restraint to change a second tensile strength of the second closed loop. A second dimension of the second restraint may vary along at least a portion of the second restraint that forms the second closed loop and the second tensile strength of the second closed loop may be dependent on the second dimension. In various embodiments, the first dimension is different than the second dimension and the first tensile strength is different than the second tensile strength.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint configured for use with an evacuation slide comprising:
    a longitudinal body having a first end and a second end;
    a plurality of engagement features distributed between the first end and the second end of the longitudinal body, wherein a dimension of at least one of the longitudinal body and the plurality of engagement features varies along at least a portion of a length of the longitudinal body; and
    a head disposed at the first end of the longitudinal body, the head defining an aperture and comprising a pawl, wherein the pawl is configured to engage an engagement feature of the plurality of engagement features.

2. The restraint of claim 1, wherein the dimension varies at least one of incrementally or continuously along at least the portion of the length of the longitudinal body from the first end to the second end.

3. The restraint of claim 1, wherein the dimension increases incrementally or continuously along at least the portion of the length of the longitudinal body from the second end to the first end.

4. The restraint of claim 1, wherein:
    the pawl is configured to sequentially traverse the plurality of engagement features in response to insertion, in a first direction, of the second end of the longitudinal body through the aperture of the head; and
    engagement between the pawl and a respective engagement feature of the plurality of engagement features prevents retraction, in a second direction opposite the first direction, of the longitudinal body through the aperture of the head such that the restraint forms a closed loop.

5. The restraint of claim 4, wherein a tensile strength of the closed loop is dependent upon the dimension of at least one of the respective engagement feature and a section of the longitudinal body adjacent the respective engagement feature.

6. The restraint of claim 4, wherein a breaking load of the restraint is selectably adjustable based on the dimension of at least one of the respective engagement feature and a section of the longitudinal body adjacent the respective engagement feature.

7. The restraint of claim 1, wherein the longitudinal body comprises two side arms and the plurality of engagement features comprises a plurality of rungs extending between the two side arms in a direction perpendicular to the length of the two side arms.

8. The restraint of claim 7, wherein the dimension is at least one of a cross-sectional thickness of each of the side arms and a cross-sectional thickness of the plurality of rungs.

9. The restraint of claim 1, wherein the restraint has a monolithic structure and thus the longitudinal body, the plurality of engagement features, and the head are integrally formed of a single material.

* * * * *